United States Patent [19]

Kobayashi et al.

[11] Patent Number: 5,743,644
[45] Date of Patent: Apr. 28, 1998

[54] TEMPERATURE MEASURING APPARATUS

[75] Inventors: Seishiro Kobayashi; Akiyoshi Nabei; Shuichi Takashina; Takashi Fujishiro, all of Tokyo, Japan

[73] Assignee: Anritsu Meter Co., Ltd., Tokyo, Japan

[21] Appl. No.: 520,649

[22] Filed: Aug. 29, 1995

[30] Foreign Application Priority Data

May 31, 1995 [JP] Japan ................................. 7-134388

[51] Int. Cl.$^6$ ........................... G01J 5/10; G01K 7/04
[52] U.S. Cl. ........................... 374/126; 374/128; 374/179
[58] Field of Search ........................... 374/126, 128, 374/179

[56] References Cited

U.S. PATENT DOCUMENTS

| | | | |
|---|---|---|---|
| 3,796,099 | 3/1974 | Shimotsuma et al. | 374/126 |
| 3,969,943 | 7/1976 | Ohno et al. | 374/126 |
| 4,984,902 | 1/1991 | Opowley et al. | 374/128 |

FOREIGN PATENT DOCUMENTS

| | | | |
|---|---|---|---|
| 0121123 | 9/1980 | Japan | 374/128 |
| 0014126 | 2/1981 | Japan | 374/128 |
| 0104226 | 8/1981 | Japan | 374/128 |

*Primary Examiner*—Diego F. F. Gutierrez
*Attorney, Agent, or Firm*—Nikaido Marmelstein Murray & Oram LLP

[57] ABSTRACT

To provide a temperature measuring apparatus making it possible to automatically calculate a correction multiplier by assuming the data measured by a contact-type thermometer as a true value and always accurately measure temperature by the noncontact method in accordance with the correction multiplier. The temperature measuring apparatus comprises noncontact- and contact-type thermometers for measuring the temperature of a temperature measurement object, arithmetic means for calculating a correction multiplier for correcting an error of data measured by the noncontact-type thermometer in accordance with the data measured by the noncontact-type thermometer and a value measured by the contact-type thermometer and moreover calculating a correction value by correcting the data measured by the noncontact-type thermometer in accordance with the correction multiplier, and display means for displaying the measured value and the correction value.

2 Claims, 5 Drawing Sheets

TEMPERATURE MEASURING APPARATUS

BACKGROUND OF THE INVENTION

The present invention relates to an improved temperature measuring apparatus using a noncontact-type thermometer, particularly to a temperature measuring apparatus capable of automatically correcting an error of a measured value due to a difference of the emissivity, reflectivity, or transmittance of a temperature measurement object.

A thermometer for measuring the surface temperature of an object is roughly divided into the following two types. One is a contact-type thermometer which measures the temperature of an object by bringing the temperature sensing section of the thermometer into contact with the surface of the object and the other is a noncontact-type thermometer which measures the temperature of an object by detecting infrared energy emitted from the surface of the object.

Because the noncontact-type thermometer has more advantages than the contact-type thermometer, it is recently used at various places. The above advantages include that heat is only slightly transferred to and from the surface of a temperature measurement object, the surface of the temperature measurement object is not damaged, and the response speed is high.

However, the noncontact-type thermometer has the following problems in view of its measuring theory. That is, <1> for a value measured by the noncontacttype thermometer, the quantity of infrared energy emitted from the surface of a temperature measurement object must be corrected depending on the material or the surface state of the object because the quantity of infrared energy depends on the material or the surface state of the object.

Moreover, <2> a measured value includes an error because infrared energy coming from places other than the surface of the temperature measurement object in addition to the infrared energy emitted from the surface of the object reflects on the surface of the object and it is detected.

As for the above problem <1>, correction values (emissivities) classified in accordance with the material or the surface state of the object are selected out of a list in a document, set to the noncontact-type thermometer correction device as parameters, and measured. However, the correction values in the document are experimentally obtained. Thereafter, it is uncertain whether the values are suitable for the material or the surface state of an actual temperature measurement object and thus, a measured value easily includes an error depending on a selected parameter. As for the problem <2>, it is believed in many cases that a value displayed by the noncontact-type thermometer including an error is a true value.

Therefore, to solve the above problems, it is hitherto believed that temperature can also accurately be measured by the noncontact-type thermometer by simultaneously using the contact-type thermometer and thereby, manually correcting an error in accordance with the temperature of a temperature measurement object measured by the contact-type thermometer.

However, the above manual error correction causes artificial errors and moreover, a value measured by the contact-type thermometer cannot instantaneously be used for error correction of the noncontact-type thermometer. Therefore, problems occurs that the value measured by the contact-type thermometer already changes at the time of correction and resultingly, no accurate correction value can be obtained.

SUMMARY OF THE INVENTION

The present invention is made to solve the above problems and its object is to provide a temperature measuring apparatus for automatically calculating a correction multiplier for correcting data measured by a noncontact-type thermometer to a true value by using data measured by a contact-type thermometer as a true value in accordance with the data measured by the contact- and noncontact-type thermometers, correcting the data measured by the noncontact-type thermometer in accordance with the correction multiplier, and always accurately measuring temperature by the noncontact method. It is another object of the present invention to provide a temperature measuring apparatus having a function for verifying whether the measurement environment is proper or not in accordance with a correction multiplier.

The temperature measuring apparatus of the present invention for achieving the above objects comprises a noncontact-type thermometer for measuring the temperature of a temperature measurement object in accordance with transfer of heat radiation to and from the temperature measurement object, a contact-type thermometer for measuring the temperature of the temperature measurement object by bringing a sensor section into contact with the surface of the temperature measurement object, arithmetic means for calculating a correction multiplier for correcting an error of data measured by the noncontact-type thermometer in accordance with data measured by the noncontact type thermometer and a value measured by the contact-type thermometer and moreover calculating a correction value by correcting the data measured by the noncontact-type thermometer in accordance with the correction multiplier, and display means for displaying the measured value and the correction value.

It is possible to properly select a sensor out of various sensors including a thermocouple and a thermistor as the contact-type thermometer in accordance with a purpose. As for the noncontact-type thermometer, it is preferable to use a thermopile or a thermistor bolometer as its infrared detector. According to one embodiment, the contact-type thermometer uses a thermocouple surface-temperature sensor and the noncontact-type thermometer uses a thermal detector. Moreover, the display means can use aurally recognizing means in addition to visually recognizing means.

According to the temperature measuring apparatus of the present invention, a measurer can correct an error of data measured by a noncontact-type thermometer set separately from a temperature measurement object in accordance with a temperature measured by bringing the sensor section of a contact-type thermometer into contact with the surface of the temperature measurement object and recognize an error correction data, that is, a correction multiplier through a display unit. In one embodiment, the display means displays which of a contact-type thermometer and a noncontact-type thermometer is more suitable for measurement in accordance with the measurement condition.

DETAILED DESCRIPTION OF THE PREFERRED EMBODIMENT

Figure 1:
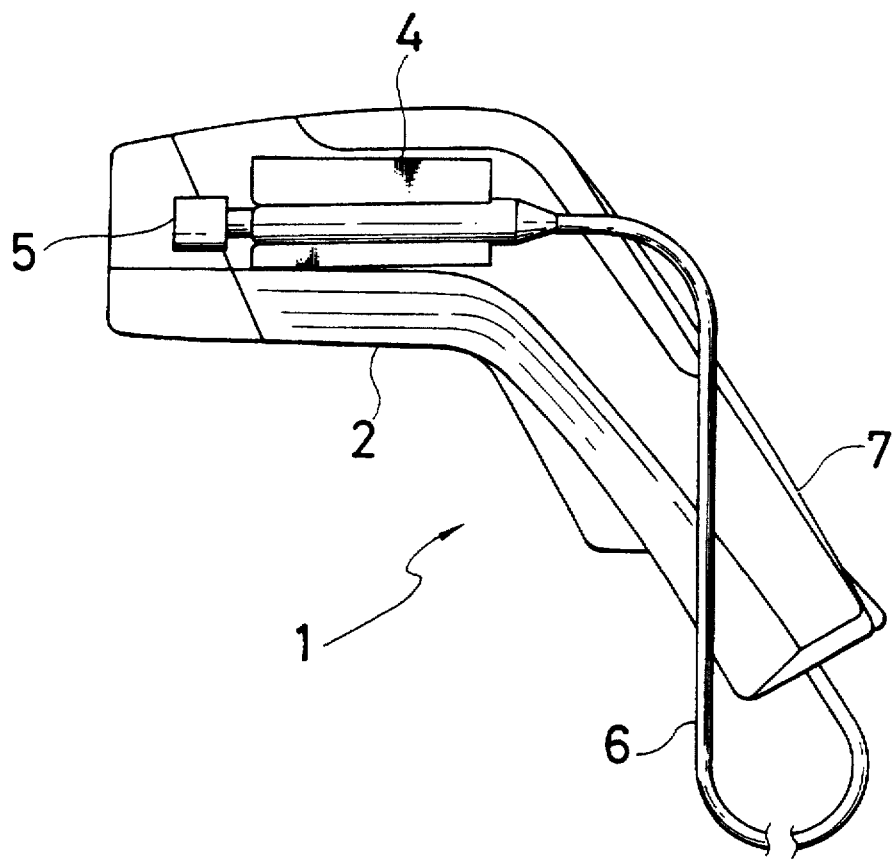
FIG. 1 is a side view of the temperature measuring apparatus of an embodiment of the present invention.
Figure 2:
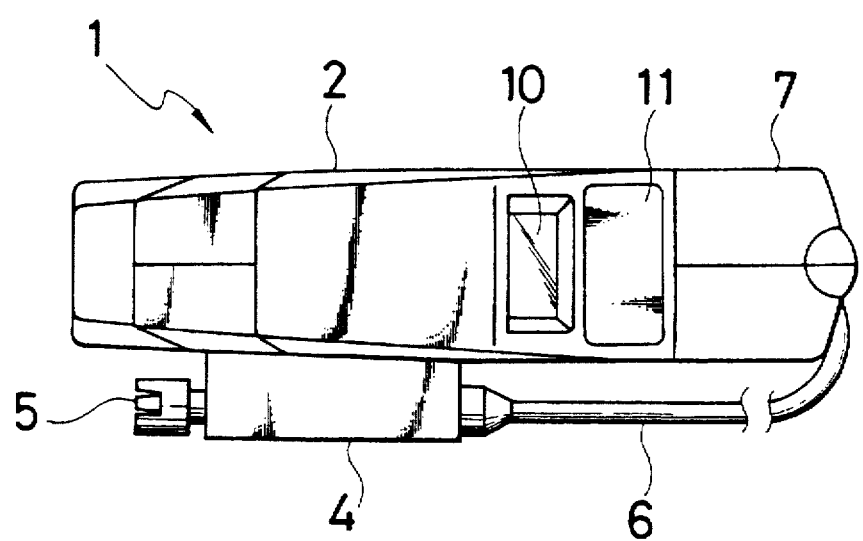
FIG. 2 is a top view of the temperature measuring apparatus shown in FIG. 1.

An embodiment of the present invention is described below by referring to the accompanying drawings.

As shown in FIGS. 1 to 4, the temperature measuring apparatus 1 of this embodiment is provided with a noncontact-type thermometer 3 set in a body case 2, a sensor section 5 supported by a holder 4 laterally protruded from the body case 2, and a contact-type temperature measuring section which is also set in the body case 2. The sensor section 5 is connected via a cable 6 to a circuit of the contact-type temperature measuring section in the body case 2.

Figure 3:
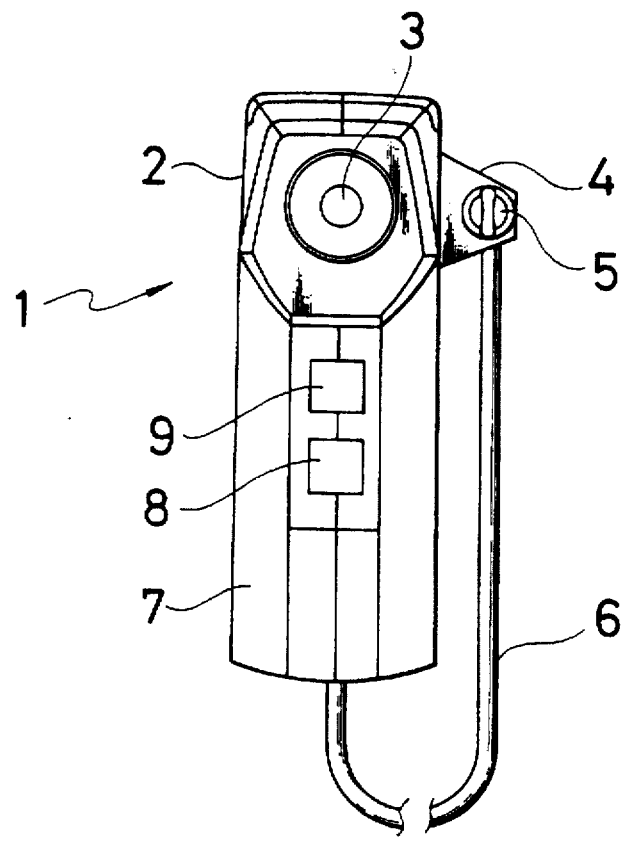
FIG. 3 is a front view of the temperature measuring apparatus shown in FIG. 1.

Part of the body case 2 serves as a grip 7 on which a laser switch 8 for emitting a pointing laser beam and a hold switch 9 for temporarily stopping display and determining correction data are set, as shown in FIG. 3.

Figure 4:
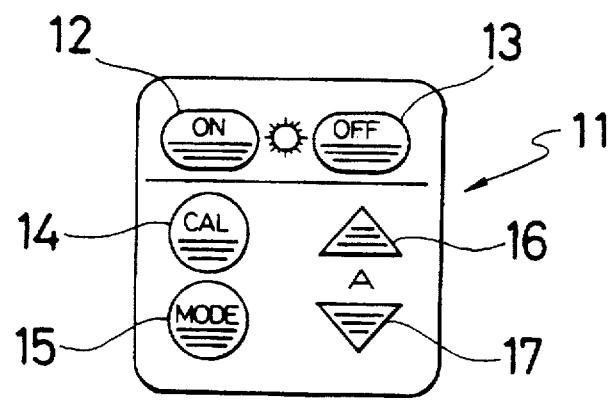
FIG. 4 is an enlarged view of the switch panel of the temperature measuring apparatus shown in FIG. 1.

Moreover, a switch panel 11 shown in FIG. 4 is set below a liquid crystal display section 10. The switch panel 11 is provided with an ON switch 12 for turning on a power supply, an OFF switch 13 for turning off the power supply, a CAL switch 14 for setting a correction measurement mode or returning the mode to the current state, a MODE switch 15 for switching between contact-and noncontact-type measurement modes, and a correction multiplier setting switches 16 and 17 for setting the value of correction multiplier $A_\epsilon$.

Figure 5:
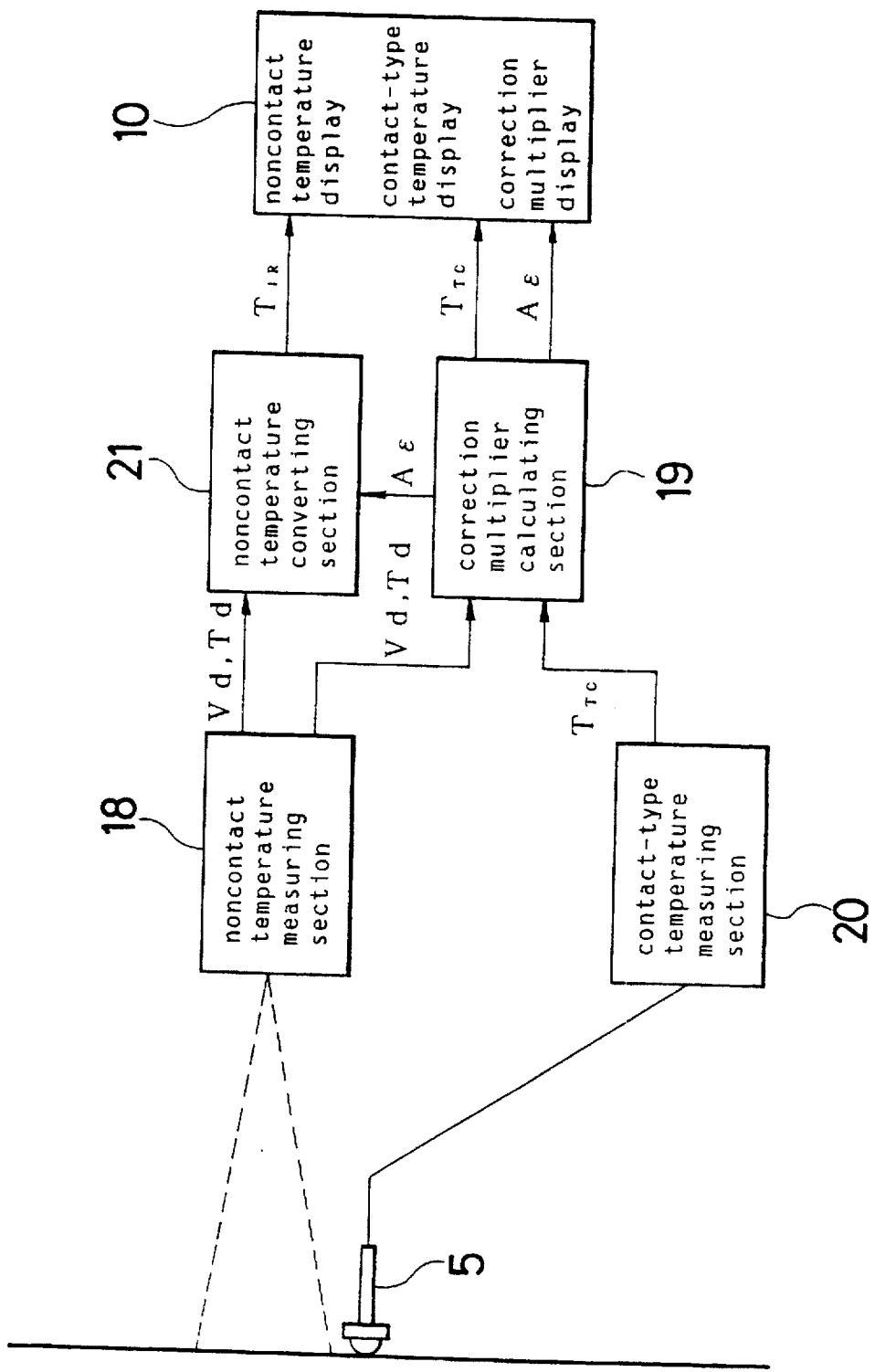
FIG. 5 is a block diagram of the internal circuit of the temperature measuring apparatus shown in FIG. 1.

A schematic view of the circuit configuration set in the body case 2 is shown in FIG. 5 in the form of a block diagram. Measured data for the output Vd of a detector (e.g. thermopile) for detecting the infrared energy emitted from a temperature measurement object, measured by a noncontact temperature measuring section 18 (an optical section for detecting infrared radiation) and the temperature Td of the detector are sent to a correction multiplier calculating section 19. Measured data inputted to a contact-type temperature measuring section 20 from the sensor section 5 is converted to a temperature value $T_{TC}$ and sent to the correction multiplier calculating section 19. In the correction multiplier calculating section 19, the correction multiplier $A_\epsilon$ is calculated through the following steps in accordance with the received data.

First, the temperature Td of the detector sent from the noncontact temperature measuring section 18 and the temperature value (temperature of the temperature measurement object) $T_{TC}$ sent from the contact-type temperature measuring section 20 are converted to an infrared energy quantity corresponding to each temperature value.

Temperature of detector: Td→Infrared energy quantity: Ld

Temperature of temperature measurement object: $T_{TC}$→Infrared energy quantity: $L_{TC}$ The correction multiplier $A_\epsilon$ is obtained from the following expression in accordance with the converted energy quantities.

$$A_\epsilon = Vd/(L_{TC} - Ld)$$

The result of calculating the above expression represents that the temperature measurement object fully reflects disturbances and only the influence of disturbances is measured for $A_\epsilon = 0$. For $A_\epsilon = 1$, however, the result represents that the temperature measurement object fully absorbs disturbances and measurement is performed under the condition in which the influence of disturbances is not included.

Moreover, for $A_\epsilon > 1$, it is considered that the following influence of disturbances occurs due to the relation between the temperatures of the temperature measurement object and the detector.

That is, when the temperature of the temperature measurement object is higher than that of the detector, a disturbance producing source with a temperature higher than that of the temperature measurement object is present. When the temperature of the temperature measurement object is lower than that of the detector, a disturbance producing source with a temperature lower than that of the temperature measurement object is present. Therefore, by using a correction multiplier (range of A>1) including disturbances, it is possible to identify the influence of the disturbance producing source on the correction multiplier $A_\epsilon$. The correction multiplier $A_\epsilon$ described above is sent to a noncontact temperature converting section 21 and the above Vd and Td are sent to the noncontact temperature converting section 21 from the noncontact temperature measuring section 18. Then, a correction value $T_{IR}$ of the noncontact-type thermometer 3 is converted by the noncontact temperature converting section 21 through the following steps.

First, to obtain the infrared energy quantity ($L_{IR}$) corresponding to the correction value $T_{IR}$, the temperature Td of the detector is converted to an infrared energy quantity.

Temperature of detector: Td→Infrared energy quantity: Ld

The infrared energy quantity $L_{IR}$ is obtained from the following expression in accordance with the converted infrared energy quantity.

$$L_{IR} = Vd/A_\epsilon + Ld$$

The infrared energy quantity $L_{IR}$ obtained from the above expression is converted to a temperature to obtain the correction value $T_{IR}$ of the noncontact-type thermometer 3.

Infrared energy quantity: Ld→Correction value of noncontact-type thermometer 3: $T_{IR}$ The correction value $T_{IR}$ thus obtained is displayed on the liquid crystal display section 10 together with the value measured by the contact-type thermometer used to calculate $A_\epsilon$ and the correction multiplier $A_\epsilon$.

Moreover, when noticing the expression for obtaining $L_{IR}$ the infrared energy quantity $L_{IR}$ is not changed by any value of $A_\epsilon$ when the value Vd is 0 (that is, when heat radiation is not transferred to and from a temperature measurement object). Therefore, when considering this case, it is necessary to make it impossible to calculate the correction multiplier $A_\epsilon$ except the case in which transfer of heat radiation to and from the temperature measurement object is kept at a certain level or higher.

Moreover, it is preferable to add a correction formula for correcting a temperature drift according to a detector or an optical characteristic to the detector output Vd.

Figure 6:
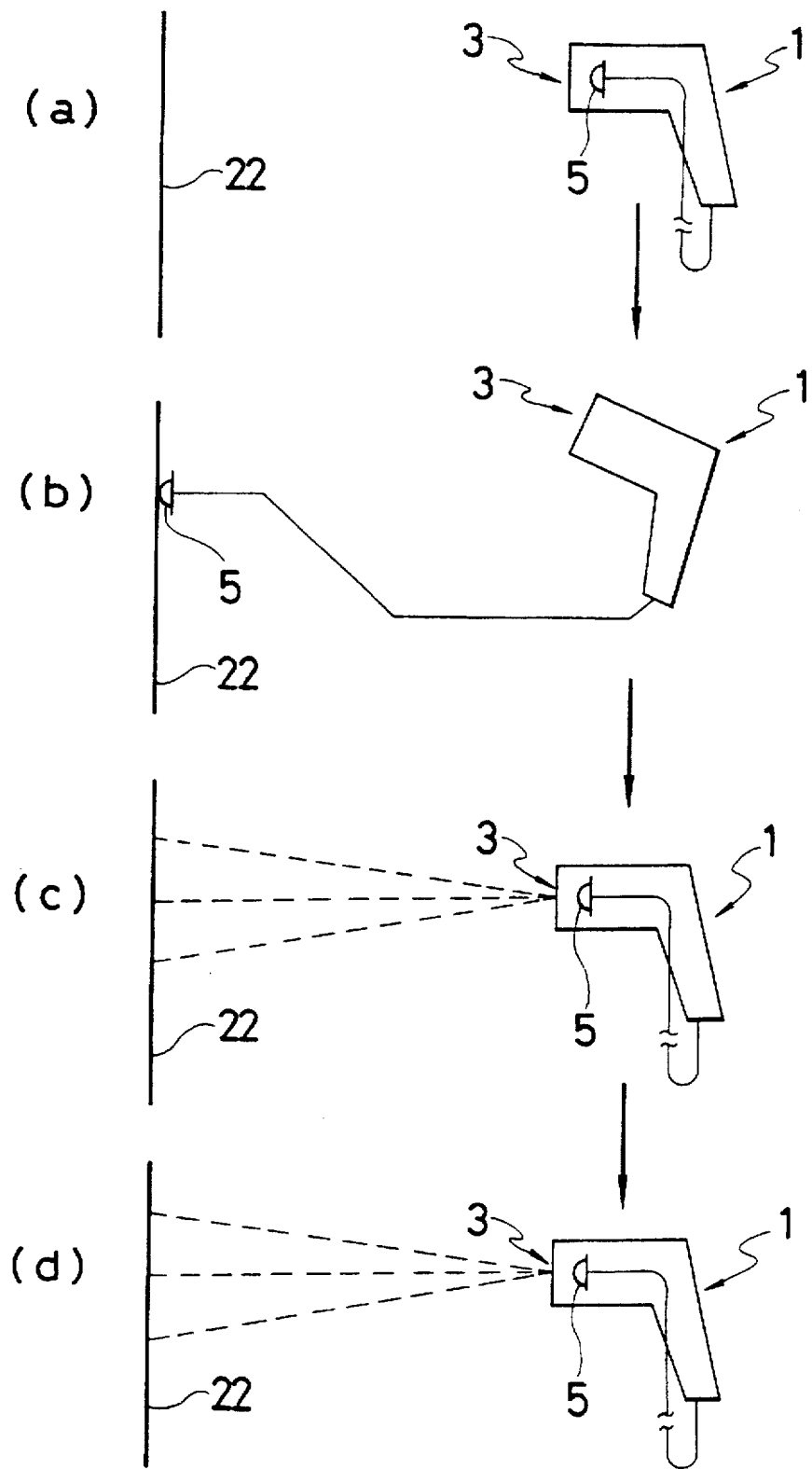
FIG. 6 is a schematic view showing a procedure for measuring temperature by using the temperature measuring apparatus shown in FIG. 1.

It is necessary to perform actual measurement in accordance with the procedure shown in FIG. 6. First, the mode is changed to the calibration mode under the state shown in FIG. 6(a) and the surface temperature of a temperature measurement object 22 with which the sensor section 5 contacts under the state shown in FIG. 6(b). Then, temperature is measured by the noncontact-type thermometer 3 under the state shown in FIG. 6(c) to determine the infrared energy quantity emitted from the surface of the temperature measurement object 22, the correction multiplier $A_\epsilon$ is calculated under the state shown in FIG. 6(d), and temperature after converted by the correction multiplier $A_\epsilon$ is displayed.

Figure 7:
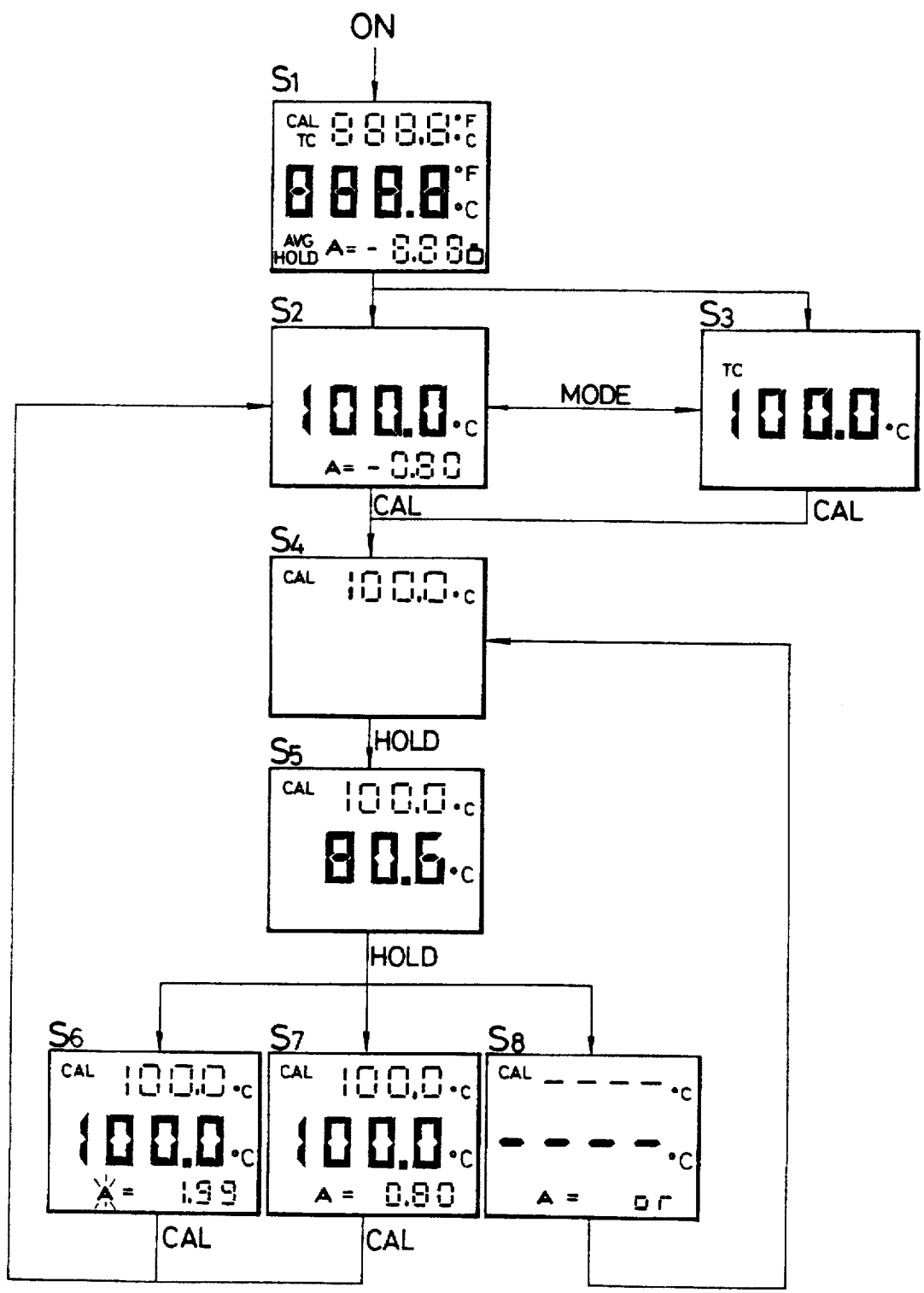
FIG. 7 is a schematic view showing displayed details by a liquid crystal display section when measuring temperature by using the temperature measuring apparatus shown in FIG. 1.

To measure temperature in the automatic error correction mode, operations are performed in accordance with the procedure shown in FIG. 7. That is, when the ON switch 12 of the switch panel 11 is pressed, all segments of the liquid crystal display section 10 are turned on to show that the temperature measuring apparatus 1 starts as shown by $S_1$ in FIG. 7. Immediately after that, the state is set in which measurement can be performed in the measuring mode used before the power supply is stopped last time as shown by $S_2$ or $S_3$ in FIG. 7.

$S_2$ shows the display of the mode for performing measurements by using the noncontact-type thermometer 3 and $S_3$ shows the display of the mode for performing measurement by using a contact-type thermometer. To change the measurement mode from $S_2$ to $S_3$ or $S_3$ to $S_2$, it is necessary to press the MODE switch 15 on the switch panel 11.

Then, to shift to the correction multiplier measuring mode shown by $S_4$ in FIG. 7, a temperature value measured by a contact-type thermometer under the condition for deciding the correction multiplier $A_\epsilon$ is determined by pressing the CAL switch 14. Then, segments of CAL showing the correction multiplier measuring mode and a temperature value indicated by the contact-type thermometer are displayed on the liquid crystal display section 10.

Then, by pressing the hold switch 9, a temperature value measured by the noncontact-type thermometer 3 under the condition for deciding the correction multiplier $A_\epsilon$ is determined as shown by $S_5$ in FIG. 7. In this case, segments of CAL showing the correction multiplier measuring mode and the temperature value indicated by the contact-type thermometer determined in the above stage are displayed and also, a temperature value (for $A_\epsilon=1$) measured by the noncontact-type thermometer 3 is displayed.

Moreover, when the decided correction multiplier $A_\epsilon$ is larger than 1 while the hold switch 9 is pressed again, the screen shown by $S_6$ in FIG. 7 appears which shows that an error due to external heat radiation occurs in a measured value by flickering a multiplier symbol because the correction multiplier $A_\epsilon$ is larger than 1. This means that the noncontact-type thermometer, a relatively large error is produced, and in this case, the contact-type thermometer is more suitable.

However, when the decided correction multiplier Ae ranges between 0 and 1 (both excluded), the screen shown by $S_7$ in FIG. 7 appears in which the correction multiplier $A_\epsilon$ is kept in the normal range and each segment does not flicker because the temperature measuring apparatus 1 normally operates. This shows that the temperature measurement can be effectively carried out with the noncontact-type thermometer. Generally, the temperature measuring operation can be made more easily with the noncontact-type thermometer than the contact-type thermometer, and the use of the noncontact-type thermometer can be more suitable in this condition.

When the correction multiplier $A_\epsilon$ is not decided because conditions necessary for deciding the correction multiplier $A_\epsilon$ are not satisfied, the screen shown by $S_8$ in FIG. 7 appears in which a temperature value indicated by the contact-type thermometer and a temperature value indicated by the noncontact-type thermometer 3 are shown by the symbol "- - -" representing that the values are indeterminate and the value of $A_\epsilon$ is displayed as "or (OVER)". This means that the noncontact-type thermometer is not useful, and in this case, the contact-type thermometer is more suitable.

By pressing the CAL switch 14, the state shown by $S_6$ or $S_7$ in FIG. 7 is returned to the state shown by $S_2$ in FIG. 7. However, when the state shown by $S_8$ in FIG. 7 appears, the state is displayed for several seconds and then automatically returned to the screen shown by $S_4$ in FIG. 7.

The temperature measuring apparatus of the present invention makes it possible to correct an error of a value measured by a noncontact-type thermometer set separately from a temperature measurement object in accordance with the temperature measured by bringing the sensor section of a contact-type thermometer into contact with the surface of the temperature measurement object and moreover, the temperature measuring apparatus allows a measurer to recognize the error correction data, that is, a correction multiplier by a display unit.

Moreover, when external heat radiation influences the heat, radiation between the temperature measurement object and the temperature measuring apparatus, the temperature measuring apparatus makes it possible to set a correction multiplier including the external heat radiation.

Furthermore, when an accurate correction value cannot be obtained because the heat radiation between the temperature measurement object and the temperature measuring apparatus is smaller than a predetermined value, the temperature measuring apparatus displays for recognition by the measurer that correction has not been made.

Furthermore, even when an error is included in a measured temperature value of the temperature measurement object because external heat radiation influences the heat radiation between the temperature measurement object and the temperature measuring apparatus, it is possible to recognize the error.

Furthermore, it is possible to display a correction multiplier of a noncontact-type thermometer and the data (e.g. value indicated by a contact-type thermometer) obtained when the correction multiplier is decided as well as a value indicated by the noncontact-type thermometer during measurement on the same screen, thereby enabling the measurer to understand the corrected condition.

Therefore, it is possible to provide a temperature measuring apparatus realizing highly accurate noncontact-type temperature measurement by combining advantages of a noncontact-type thermometer with those of a contact-type thermometer.

What is claimed is:

1. A temperature measuring apparatus, comprising
   a noncontact-type thermometer for receiving heat radiation from a temperature measurement object and measuring the temperature of the temperature measurement object;
   a contact-type thermometer for contacting the temperature measurement object and measuring the temperature of the temperature measurement object;
       said noncontact-type thermometer comprising a portable body case with a holder housed therein, said contact-type thermometer comprising a sensor section removably supported by said holder;
   arithmetic means set in said portable body case for automatically calculating a correction multiplier based on the temperature measured of the temperature measurement object by said noncontact-type thermometer and the temperature measured of the temperature measurement object by said contact-type thermometer, and automatically correcting the temperature measured by the noncontact-type thermometer by the calculated correction multiplier; and
   display means set in said portable body case for displaying the calculated correction multiplier and a corrected value of the temperature measured of the temperature measurement object by said noncontact-type thermometer as automatically corrected by the correction multiplier, wherein the display means displays that an accurate correction value has not been determined when the heat radiation between the temperature measurement object and the noncontact-type thermometer is smaller than a predetermined value.

2. A temperature measuring apparatus, comprising a noncontact-type thermometer for receiving heat radiation from a temperature measurement object and measuring the temperature of the temperature measurement object;

a contact-type thermometer for contacting the temperature measurement object and measuring the temperature of the temperature measurement object;

said noncontact-type thermometer comprising a portable body case with a holder housed therein, said contact-type thermometer comprising a sensor section removably supported by said holder;

arithmetic means set in said portable body case for automatically calculating a correction multiplier based on the temperature measured of the temperature measurement object by said noncontact-type thermometer and the temperature measured of the temperature measurement object by said contact-type thermometer, and automatically correcting the temperature measured by the noncontact-type thermometer by the calculated correction multiplier; and display means set in said portable body case for displaying the calculated correction multiplier and a corrected value of the temperature measured of the temperature measurement object by said noncontact-type thermometer as automatically corrected by the correction multiplier, wherein the display means displays which of the contact-type thermometer and the noncontact-type thermometer is more suitable for measuring the temperature of the temperature measurement object.

* * * * *